United States Patent
Karle (10) Patent No.: US 11,237,460 B2
(45) Date of Patent: Feb. 1, 2022

(54) SOFTBOX

(71) Applicant: Stefan Karle, Munich (DE)

(72) Inventor: Stefan Karle, Munich (DE)

(73) Assignee: Stefan Karle, Munich (DE)

( * ) Notice: Subject to any disclaimer, the term of this patent is extended or adjusted under 35 U.S.C. 154(b) by 0 days.

(21) Appl. No.: 16/922,443

(22) Filed: Jul. 7, 2020

(65) Prior Publication Data

US 2021/0011357 A1 Jan. 14, 2021

(30) Foreign Application Priority Data

Jul. 10, 2019 (DE) .......................... 102019118714.1
May 5, 2020 (DE) .......................... 202020102522.8

(51) Int. Cl.
*G03B 15/06* (2021.01)
*F21V 1/06* (2006.01)
*F21V 17/10* (2006.01)

(52) U.S. Cl.
CPC ................ *G03B 15/06* (2013.01); *F21V 1/06* (2013.01); *F21V 17/108* (2013.01)

(58) Field of Classification Search
CPC ................... G03B 15/06; G03B 15/07; G03B 2215/0589; G03B 2215/0592; F21V 1/06; F21V 17/108; F21V 17/10; F21V 3/02
USPC ............................................................ 396/4
See application file for complete search history.

(56) References Cited

U.S. PATENT DOCUMENTS

| | | | | |
|---|---|---|---|---|
| 3,065,531 A | * | 11/1962 | Rosenthal | F21V 1/00 29/450 |
| 3,745,332 A | * | 7/1973 | Weisbrod | F21V 1/26 362/357 |
| 4,446,506 A | * | 5/1984 | Larson | G03B 15/02 362/17 |
| 4,649,463 A | * | 3/1987 | Baliozian | G03B 15/02 362/17 |

(Continued)

FOREIGN PATENT DOCUMENTS

CN 209590496 U 11/2019
CN 209842309 U 12/2019

(Continued)

OTHER PUBLICATIONS

Examination Report of the Great Britain Patent Office for GB Application No. 2017592.3 dated Apr. 13, 2021.

*Primary Examiner* — Tsion Tumebo
*Assistant Examiner* — James M Endo
(74) *Attorney, Agent, or Firm* — Park, Vaughan, Fleming & Dowler LLP; Laxman Sahasrabuddhe (57) ABSTRACT

A softbox for being mounted to spotlight door flaps includes plural flat sides, at least two of which are mutually non-adjacent, wherein pockets for accommodating the spotlight door flaps are arranged on the at least two mutually non-adjacent flat sides of the softbox, wherein the pockets are each provided with an insertion opening, and wherein the insertion openings are configured to be reversibly variable with regard to their widths. The softbox includes at least two side walls, and further includes a light-baffle arranged between the at least two side walls of the softbox, wherein the light-baffle includes at least two translucent planes inclined to one another, and wherein the plural translucent planes together form a shape having a base facing towards the spotlight.

13 Claims, 4 Drawing Sheets

(56) References Cited

U.S. PATENT DOCUMENTS

| | | | | |
|---|---|---|---|---|
| 4,731,715 | A * | 3/1988 | Anderson | F21V 1/26 362/352 |
| 5,154,503 | A * | 10/1992 | Sternsher | F21V 7/18 362/16 |
| 5,311,409 | A * | 5/1994 | King | G03B 15/06 362/17 |
| 5,347,432 | A * | 9/1994 | Chiavetta | F21V 11/18 362/18 |
| 6,010,234 | A * | 1/2000 | Rahn | G03B 15/06 362/278 |
| 6,076,935 | A * | 6/2000 | Kester | G03B 15/02 362/16 |
| 6,513,955 | B1 * | 2/2003 | Waltz | F21V 1/06 362/16 |
| 6,652,127 | B2 * | 11/2003 | Tarabula | F21V 15/02 362/376 |
| 7,399,097 | B1 * | 7/2008 | DeLaPaz | G03B 15/02 362/17 |
| 8,313,203 | B1 * | 11/2012 | Guiney | G03B 15/02 362/18 |
| 8,824,877 | B1 | 9/2014 | Karle | |
| 10,571,111 | B2 | 2/2020 | Yellin et al. | |
| 2005/0088836 | A1 * | 4/2005 | Lowe | G03B 15/06 362/18 |
| 2006/0007666 | A1 * | 1/2006 | Cook | G03B 15/02 362/16 |
| 2007/0041201 | A1 * | 2/2007 | Mazzei | G03B 15/02 362/347 |
| 2008/0079906 | A1 * | 4/2008 | Finn | F21V 5/04 353/53 |
| 2010/0124068 | A1 * | 5/2010 | Karie | F21V 17/06 362/433 |
| 2011/0255851 | A1 * | 10/2011 | Honl | G03B 15/03 396/198 |
| 2013/0271978 | A1 * | 10/2013 | Gould | F21V 5/02 362/235 |

FOREIGN PATENT DOCUMENTS

| | | |
|---|---|---|
| KR | 1020180061937 A | 6/2018 |
| WO | 2018186536 A1 | 10/2018 |

* cited by examiner

SOFTBOX

RELATED APPLICATIONS

This application claims priority under 35 U.S.C. § 119 to German Patent Application No. 10 2019 118 714.1, filed Jul. 10, 2019 and German Patent Application No. 20 2020 102 522.8, filed May 5, 2020, the contents of which are herein incorporated by reference in their entirety for all purposes.

FIELD

The present invention relates to a softbox, in particular for being mounted to the "barn door" or "barn doors" (in particular, the flaps thereof) of a spotlight, as well as a system with the spotlight's "barn doors" and the softbox mounted thereto.

In the context of present application, a softbox shall be understood as meaning a device which is mounted to the light emitting side of a spotlight, in order to make the emitted light have a certain intensity distribution; and in particular, in most applications, in order to make the light exiting from the softbox towards the lighted object more homogeneous, than that emitted from the spotlight. Additionally, the light emitting area of the softbox is larger than that of the spotlight, whereby the illumination of the objects is perceived "softer"; from which effect the term stems.

BACKGROUND

Figure 1:
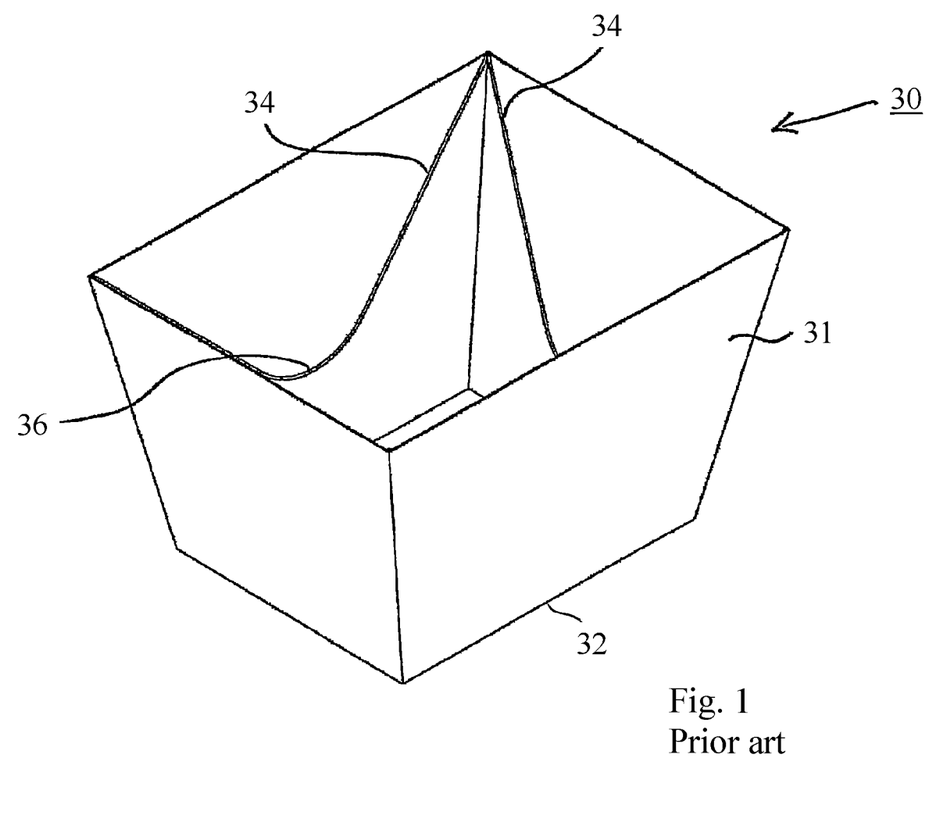
FIG. 1 shows a softbox of the prior art.

A softbox 30 known from DE 10 2012 104 779 A1, of the relevant kind, is shown in FIG. 1, wherein lateral flat sides 31 are tensioned by tensioning struts 34, the curved parts 36 of which inherently provide shape stability. Not shown is a light intensity distribution homogenizing "baffle" at the light exit (in the drawing: upper) side of the softbox 30. Such a softbox is mounted with its edges 32 at its light entry side facing towards the spotlight.

The "barn doors" to be equipped with such a softbox usually have, according to their geometry, four (see FIG. 2), six, or eight alternatingly larger and smaller spotlight "barn door" flaps for limiting the illuminated field laterally. The most common structure includes two larger, approximately trapezoidal door flaps having the longer sides of the trapezoid outward with respect to the spotlight, and two smaller trapezoidal door flaps having the shorter sides of the trapezoid outward, or sometimes smaller rectangular flaps. The respective smaller door flaps are usually configured to be inwardly foldable; the respective larger ones are usually configured to be inwardly foldable onto the folded-in smaller door flaps. These door flaps may be arranged around an essentially circular or quadratic light emission area, or around an oval or rectangular light emission area, wherein in the latter case, the smaller door flaps are usually arranged at the shorter sides of the rectangle or oval, respectively. In most cases the door flaps are not completely trapezoidal, but include a trapezoidal part and a rectangular part; for example in such a manner that the larger door flaps have their rectangular part on their radially outer side, and the smaller door flaps have their rectangular part at their radially inner side. The door flaps are linked to a single-part or multi-part hinge structure, which together with the door flaps constitutes the spotlight "barn door" proper and is in turn configured to be mounted at or around the light emission opening of a spotlight.

It is known from DE 10 2013 004 665 A1 of the present inventor a softbox which is configured for being mounted to spotlight "barn" doors, however, predominantly rectangular ones. It has been found that with the known device, for each size of the spotlight "barn" doors a specially adapted softbox is required, which is inconvenient when there are several spotlights from which the most suitable one is selectable.

The present invention aims at alleviating or resolving this issue, by providing a device which is more easily handled.

SUMMARY

To this end, the present invention provides an embodiment in which there are pockets in mutually non-adjacent flat sides of the softbox for accommodating corresponding spotlight door flaps, wherein the openings of the pockets are variably adjustable with regard to their width, so as to be adaptable to different door flaps of various spotlight sizes.

It is furthermore desirable to provide methods of mounting a softbox to spotlight "barn" doors, which can readily be carried out. To this end, the present application suggests, in one embodiment, to insert two mutually non-adjacent spotlight door flaps through the insertion openings into the pockets; and to put each of fastening straps from one of the flat sides of the softbox around some component of the spotlight, the spotlight "barn" door, or the "barn" door flap, back to the flat side of the softbox, and to fix its end at the flat side of the softbox or to the outer side of the pocket. The present application also suggests, in another embodiment, to insert two mutually non-adjacent spotlight door flaps though the insertion openings into the pockets; and to partially close the insertion openings on both sides of the inserted spotlight door flaps, in such a manner that the softbox is mounted thereto. This variant is particularly beneficial when the side edges of the spotlight "barn" door flaps are strongly inclined, because in that case the holding effect exerted by the closed parts of the insertion opening is most prominent.

Advantageously, it is also enabled a fixation in the radial or in an inclined direction, by means of holding straps which are variably adjustable as regards their length. These and other preferred embodiments are defined in the appended dependent claims.

The variability of the width adjustment is advantageously provided by suitably arranged hook-and-loop fasteners, e.g., by a first component, located directly at the flat side of the softbox, and by a second, (counter) component forming the inner rim of the pocket, which in turn may also be formed as a first component on the outer side. The invention is, however, not limited to the two components of a hook-and-loop fastener.

The inserting of the respective spotlight "barn" door flap is made considerably easier, when the component forming the inner rim of the insertion opening is itself constituted by two parts, each configured so as to be outwardly foldable, and after inserting the door flap, to be folded inwardly and fixed their respective outer part, namely where the inserted spotlight door flap does not reach. Naturally, this region is the larger, and the holding effect is the more pronounced, the smaller the door flap is, and the more the side edges of the door flap are inclined, i.e., the more the shape of the door flap deviates from the shape of a rectangle, towards the shape of a trapezoid.

For further, or in some cases, only, fixation in a radial direction, advantageously straps are arranged at the softbox flat sides, which in use are put either around a component of the spotlight or alternatively, in particular when the door flaps are relatively large, are put around the inclined sides of the trapezoid in an oblique direction, and are fixed with their end parts at respective fastening areas or spots at the flat side of the softbox, or the outer side of the pocket. To this end, for example, the outer side of the pocket may be provided with a respective fastening area; it is particularly preferred if this is accomplished, again, with a hook-and-loop component which is complementary to the end part of the fastening strap. These fastening straps may also serve for fastening where the spotlight "barn" doors are so big, and/or their outer edges are so little inclined, that the holding effect provided by the narrowing of the insertion opening in the width direction does not suffice.

In the case of a four-sided softbox, the light emitting area of which accordingly is rectangular or quadratic, and the pockets are advantageously located at mutually opposing flat sides. In the case of a six-sided softbox, the pockets may be located at two mutually opposed flat sides, or at three flat sides which are mutually non-adjacent. In a similar fashion, in the case of an eight-sided softbox, the pockets may be located at (only) two mutually opposed flat sides, or at all four flat sides being mutually opposed cross-wise. In general, it is advantageous in terms of practicality, when the pockets are located on the respective outer sides of the respective flat sides of the softbox; however, it is also conceivable to locate the pockets on the respective inner sides of the respective flat sides of the softbox.

According to another aspect, the softbox includes a light baffle arranged between plural ones of its flat sides, preferably ones which are mutually non-adjacent. These flat sides may be, but need not be identical to those which are mounted to the door flaps of the spotlight. The light baffle may be centered in front of the light emitting area of the light source of the spot light, and may include plural translucent planes which are inclined to one another in such a manner that the structure enclosed by them has a base area (itself, without a translucent plane) facing the spotlight. Such a structure is also part of the invention without the above described mounting to spotlight "barn" doors, namely, with an independent mounting or without any particular mounting, under this aspect. The shape formed by the translucent planes may, e. g., be that of a wedge, a frustrated wedge, a pyramid, a frustrated pyramid, a cone, a frustrated cone, a hemisphere, or a section of a sphere, or may be composed or a combination of such elements, but is not limited to those geometric shapes. The pyramid or the frusto-pyramid may, but need not, be regular; in the special case of a rectangular base area and a frustrated tip, an (mathematical) obelisk results. An (common) obelisk being the combination of a steep, regular frusto-pyramid with another, smaller, and more slanted pyramid on top, is also feasible.

Such a structure may comprise four triangles which are mutually inclined, and which together constitute a four-sided pyramid, the tip of which faces away from the spotlight and the base area of which faces towards the spotlight. Other numbers of sides are likewise feasible; it is preferred, but not necessary, that the number of sides of the pyramid (or, in a variant, the frusto-pyramid) matches the number of flat sides of the softbox. It is, on the other hand, likewise envisioned, that instead of a pyramid or a frusto-pyramid, a structure in the shape of a wedge, a frustrated wedge, a cone or a frustrated cone or a hemisphere or a section of a sphere or a structure composed of such elements is arranged between the flat sides. The base area of the structure, which itself need not be a translucent plane, but may be constituted by one, in each case faces the spotlight. In most, but not all cases, this will be the largest plane constituting the structure. It is preferred if the tip or other side of the structure facing away from the spotlight is tensioned towards the flat sides. In this variant, the flat sides may be plane, or may be slightly curved by being themselves tensioned by tensioning devices directly or indirectly mounted on the spotlight. The effect of such a translucent structure in the main beam path is that of a considerable homogenization of the radial light intensity distribution, as is particularly advantageous when using relatively small, strong light sources (such as recent LEDs). Without wishing to be bound by theory, it is believed that this effect is brought about by the diffuse partial reflection of light at the inclined translucent planes.

BRIEF DESCRIPTION OF THE DRAWINGS

The forgoing as well as other advantageous features of the disclosure will be more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

The known softbox 30 shown in FIG. 1 has flat sides 31 and elastic struts 34 automatically tensioning same, the curved central parts 36 of which provide the required tensioning force. The present invention is, however, not restricted to this particular example of softbox pre-tensioning or biasing; rather, any other means are conceivable by which it is achieved that the diffuser plane or layer (not shown) in most cases provided on the light emission side of the softbox remains tensioned. This diffuser layer serves in most part for achieving a comparatively homogeneous light intensity distribution in the lateral direction.

Figure 2:
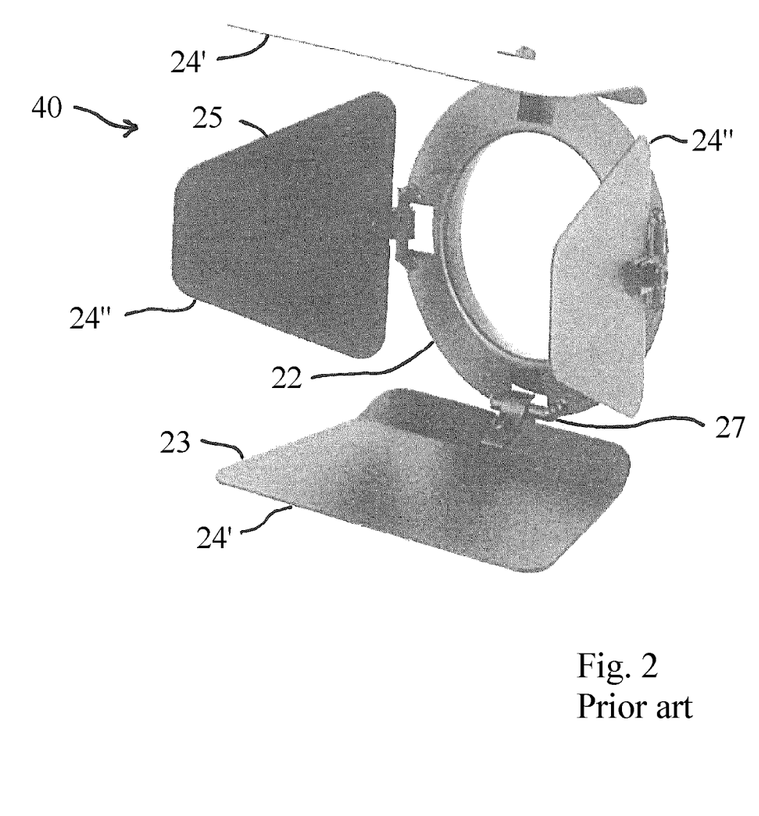
FIG. 2 shows a spotlight "barn" door construction of the prior art.

FIG. 2 shows a typical spotlight "barn" door construction 40 with, in this case, four pairwise equivalent spotlight "barn" door flaps 24', 24". As is discernible in this drawing, the side edges 25 of the smaller ones of the door flaps 24" are narrowed trapezoidally outwardly, while the side edges 23 of the larger ones of the door flaps are trapezoidally widened outwardly. All door flaps 24', 24" are linked to a generally ring shaped construction 22 by hinges 27, in order to ensure the foldability of the flaps 24', 24". The ring shaped construction 22 will itself be mounted to the light emission area of a spotlight by suitable means, so that the door flaps 24', 24" follow the movements of the spotlight. The larger ones of the door flaps identified by 24' in this drawing correspond to the door flap with the reference numeral 20 in the following FIG. 4.

Figure 3A:
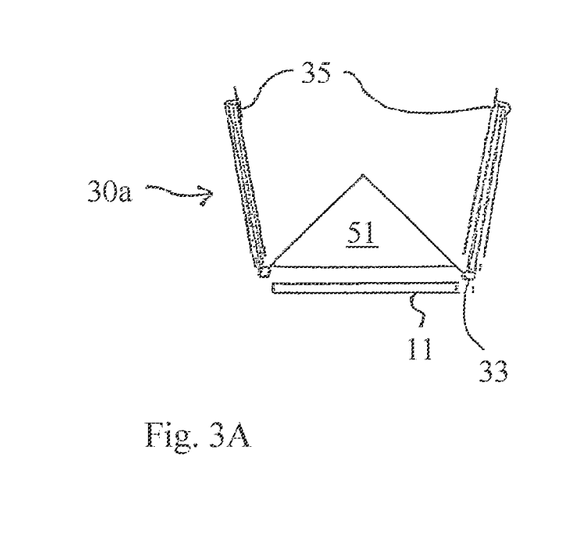
FIG. 3A, B show an embodiment of the present invention with a light baffle.
Figure 3B:
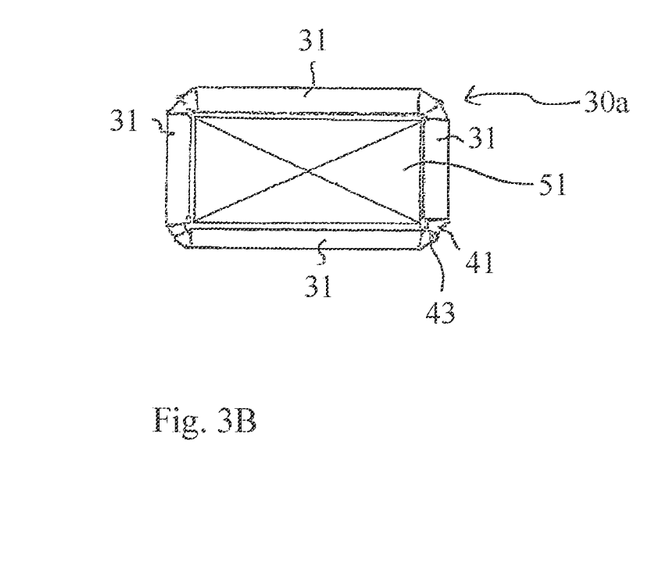

In FIGS. 3A (cross sectional view) and 3b (top view) it is exemplarily shown how a light baffle is arranged within the space encompassed by the spotlight "barn" doors 31 and the softbox 30a mounted thereon, in this case in the shape of a pyramid 51 with a rectangular base area. The shape is not particularly restricted, but the base area always faces the light emission area 11 of the spotlight. For easier orientation, the hinges 33 of the door flaps and the bottom 35 of the pocket is also shown. For reasons of clarity, a possible tensioning of the pyramid's tip e.g. towards mutually opposing edges of the softbox is not shown; also, an itself rigid construction of the light baffle is envisioned. Moreover, it is shown that at the edges of the softbox, preferably triangular pieces 41 of some flat material each with a folding line 43 are arranged, by means of which the softbox can be mounted on the door flaps 31, on the one hand, so as to fully encompass the space accommodating the light baffle 51; and which allow, on the other hand, that the softbox 30$a$ is configured to be foldable.

The number of edges of the pyramid is preferably, but not necessarily, equal to the number of edges of the softbox; in the exemplary case both numbers are respectively 4. It is also preferable, but not necessary, that the light baffle 51 ends in a tip. Alternatively, the plane facing away from the light source may be made a plane parallel to the base area, however translucent in contrast to the latter. In the case of a rectangular base area, the resulting body is mathematically an obelisk. Depending on the shape of the base area, regular pyramids or frusto-pyramids, respectively, may also result; in the simplest case, a wedge is also possible. In addition, light baffles are envisioned the base area of which is circular, elliptical or generally oval, so that a cone or frusto-cone, respectively, results. With a little more effort, even hemispherical shells or sections of a sphere can be realized.

Figure 4:
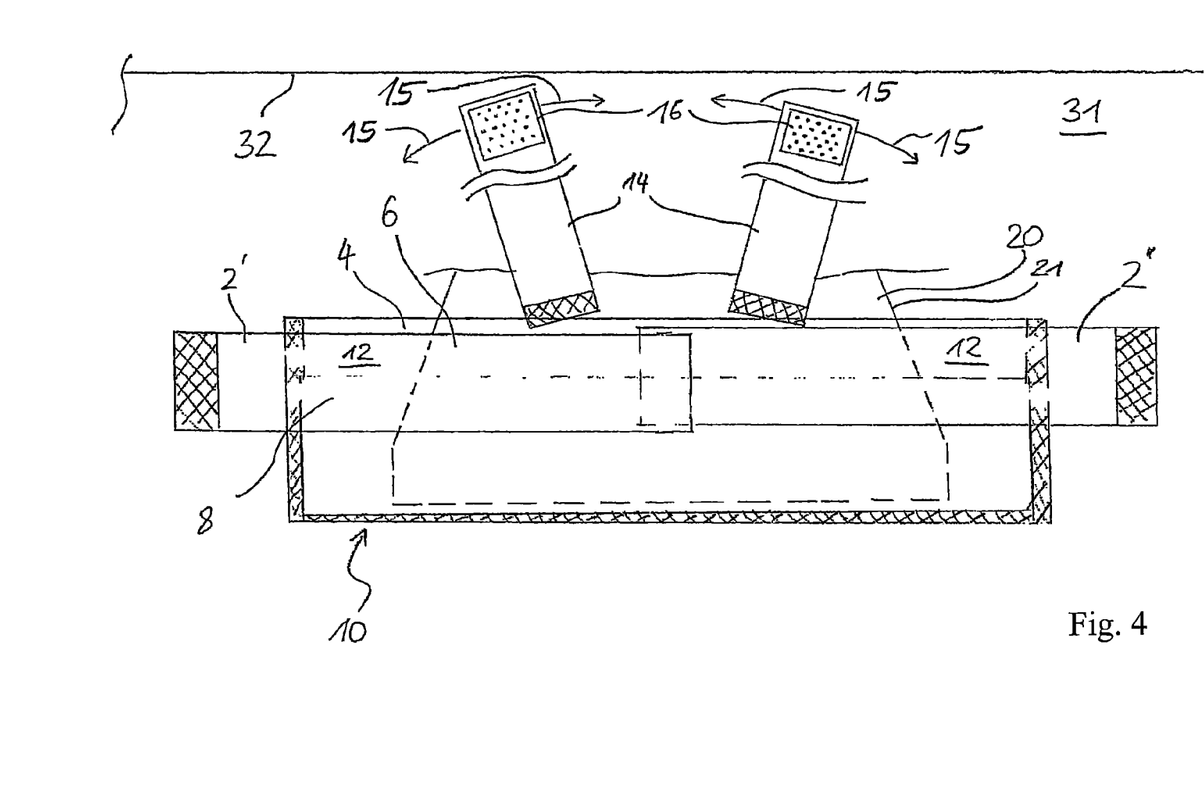
FIG. 4 shows another embodiment of the present invention in a partial view of some of its components, along with the inserted spotlight "barn" door flap.

FIG. 4 schematically shown how a pocket 10 is arranged on the flat side of the softbox in relation to the inserted spotlight "barn" door flap 20 according to an embodiment. Herein, the opening formed between the layer 4, in this exampled sewn onto the outer side of the flat side of the softbox, and the complementary layer 6 adhered to the inner side of the fixing straps 2' and 2", respectively, is closed again in the regions 12 on both sides of the inserted spotlight door flaps 20 subsequent insertion thereof, in order to achieve a holding effect (sewn and adhered areas are shown by cross hatching). To this end, the pocket is fitted with mutually complementary fixing components 4 and 6 at least in the region of its insertion opening, in this case with components of a hook-and-loop fastener, as that is most convenient and most available. In this example, two laterally foldable strap parts 2' and 2" are provided, in order to render insertion of the spotlight door flaps 20 easier. Furthermore, additional holding straps 14 are provided, one end of which is permanently fixed, which additional holding straps initially run towards the edge 32 of the flat side of the softbox at the light entry side and which, in use, can be put around some component of the spotlight, or else may be put in an inclined fashion around the oblique regions 21 of the side edges of the spotlight door flaps 20, and which may be reversibly fixed, with their fee ends, to the flat sides of the softbox, e. g. at the pocket, and which may, for this purpose, equally include an area with another hook-and-loop fastener 16 (shown in dotted lines). Those additional holding straps 14 provide an additional or, with big and/or rectangular spotlight door flaps 20, the only fixation of the softbox to the spotlight or the spotlight "barn" door or the respective spotlight door flap 20, respectively. The additional holding straps 14 are in most case in themselves sufficiently flexible to either be put around a suitable component in a radial direction, or else to be out around a side edge of the spotlight "barn" door 20 in an inclined direction. Nevertheless, the permanent fixing of the one end of the additional holding straps 14 may be effected through a D-ring or the like, in order to enable an adjustment (arrows 15) of the lateral angle of the direction of the pulling force of the additional holding straps 14, without the material of same having to twist. The respective counter component for the hook-and-loop component 16 of the holding straps may, in the simplest case, be arranged at or by the pocket 10, by means of the outer surface thereof being provided with, or constructed from the respective material. Generally, a separate mounting is also envisioned. In addition, and contrarily to what is shown in FIG. 4 merely for reasons of clarity, it is also envisioned to sew the holding straps 2' and 2", respectively, together with the two layers 4 and 8 of the pocket 10 to the flat side 31 of the softbox. In the embodiment shown, the layer 8 of the pocket 10 facing outwards is also provided, on its outer side, with a hook-and-loop counter-component, for occasionally fixing the free ends of the additional holding straps 14 thereto, and for additionally fixing the holding straps 2', 2".

The manner of mounting is as follows: Initially, the respective spotlight door flap 20 is inserted into the opened pocket 10. Then, the insertion opening is closed by pressing together fixing components 4 and 6 from both outer ends of the opening, as far as that is possible with the inserted door flap 20, so that—at least in a case where the side edges of the door flap 20 is sufficiently strongly inclined—some holding force is exerted, as well as the lateral movability of the door flap 20 in the pocket 10 is reduced or even minimized. Then, the additional holding straps 14 are placed around some component of the spotlight or, when their length does not so admit due to a large door flap, around inclined side edges of the trapezoid door flap 20, and reversibly fixed to the flat side 31 of the softbox by means of the fastening component 16 located at their free ends, whereby the softbox is itself fixed to the spotlight and its door flaps 20. It is preferable, but not strictly necessary, that the same kind of material, or pair of materials, respectively, is used for fixing the additional holding straps 14 as for closing the insertion opening. An attachment to the outer side of the pocket 10 itself is particularly preferred. Incidentally, to this end it is preferred not to make the region 16 at the free end of the additional holding strap employed as, or provided with, the fixing component approximately quadratic, as depicted in FIG. 2 for reasons of simplicity, but to rather provide a relatively long part near the free end of the additional holding strap with the fixing component 16, because thereby, the flexibility of use is enhanced. Additionally or alternatively, it is possible to provide a correspondingly large area of the outer side of the flat side of the softbox with the corresponding fixing counter-component. E.g., it is preferable to arrange a strip provided with the fixing counter-component transversely on the outer side of the flat side of the softbox, in order to, in this manner, achieve an as large as possible flexibility regarding the mounting angle of the additional holding straps 14, with little material.

The softbox as presented herein, and the method of mounting it as explained above, enable mounting the softbox to spotlights or spotlight "barn" doors or spotlight "barn door" flaps, respectively, of different sizes, so that a change of the spotlight or the like is simple and readily made with little effort. Taking off the softbox from one spotlight and re-mounting it on another one requires only a few actions. Nevertheless, the mounting is sufficiently rigid to allow the softbox to follow the movements of the spotlight which occur during use thereof, and does not require re-orientation.

The present invention has been described making reference to embodiments, but should not be construed as being limited thereto. Rather, the invention is directed generally to a softbox for mounting to spotlight "barn" doors which includes pockets provided on two mutually non-adjacent flat sides of the softbox for accommodating spotlight door flaps, wherein insertion openings of the pockets are configured to be reversibly variable regarding their widths. Methods for mounting the softbox to spotlight "barn" doors include inserting the door flaps into pockets of the softbox, and placing holding straps from a flat side of the softbox around a component of the spotlight or the spotlight "barn door" or the spotlight door flaps, to the respective flat side of the softbox, for there being fixed, and/or the partially and reversibly closing of the insertion opening on both sides of the spotlight door flap inserted therein. The softbox together with the spotlight "barn door", to the door flaps of which it is mounted, constitutes a softbox system according to the invention.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

What is claimed is:

1. A softbox for being mounted to spotlight door flaps, the softbox comprising plural flat sides, wherein at least two of the plural flat sides are mutually nonadjacent, wherein pockets for accommodating the spotlight door flaps are arranged on the at least two mutually nonadjacent flat sides of the softbox;
   wherein the pockets are each provided with an insertion opening, and wherein the widths of the insertion openings are configured to be reversibly variable, wherein each of the insertion openings is provided by an outer surface of the respective flat side of the softbox and an inner side of the pocket, and wherein both are provided with mutually complementary fixing components, wherein each of the pockets, on an outer side thereof, includes two holding straps which are arranged on both outer sides of the width of the insertion opening.

2. The softbox of claim 1, wherein the mutually complementary fixing components are provided by a hook component and a loop component of a hook-and-loop fastener.

3. The softbox of claim 1, wherein the pockets are arranged on respective outer faces of the softbox.

4. The softbox of claim 1, wherein the pockets are arranged on respective inner faces of the softbox.

5. The softbox of claim 1, further including holding straps, one end of the holding straps being permanently affixed to the respective flat side, and the other end of the holding straps being arranged to be reversibly affixed to the respective flat side.

6. The softbox of claim 1, further including a light-baffle arranged between at least two of the plural flat sides.

7. The softbox of claim 6, wherein the at least two of the plural flat sides are not adjacent to one another.

8. The softbox of claim 6, wherein the light-baffle is arranged centrally and includes plural translucent planes inclined to one another.

9. The softbox of claim 8, wherein the softbox is arranged for being mounted in front of a spotlight, and wherein the plural translucent planes together form a shape having a base facing towards the spotlight.

10. The softbox of claim 9, wherein the structure formed by the plural translucent planes together with the base is at least one selected from the group consisting of a wedge, a truncated wedge, a pyramid, a truncated pyramid, a cone, a truncated cone, a hemisphere, a section of a sphere, and combinations thereof.

11. The softbox of claim 9, wherein the light-baffle is tensioned towards at least two of the plural flat sides or towards at least two of edges formed by adjacent ones of the plural flat sides, at the face or tip of the light-baffle facing away from the spotlight.

12. A softbox for being mounted to spotlight door flaps, the softbox comprising:
    plural flat sides, wherein at least two of the plural flat sides are mutually non-adjacent, wherein pockets for accommodating the spotlight door flaps are arranged on the at least two mutually non-adjacent flat sides of the softbox;
    wherein the pockets are each provided with an insertion opening;
    wherein the widths of the insertion openings are configured to be reversibly variable;
    wherein the softbox further includes holding straps, one end of the holding straps being permanently affixed to the respective flat side, and the other end of the holding straps being arranged to be reversibly affixed to the respective flat side; and
    wherein the softbox further includes a first fastening component which is arranged at an outer face of the pocket or at an outer rim of the insertion opening, wherein the other end of each holding strap is provided with a second fastening component which is complementary to the first fastening component.

13. The softbox of claim 12, wherein the first and second fastening component are respectively provided by a hook component and a loop component of a hook-and-loop fastener.

* * * * *

UNITED STATES PATENT AND TRADEMARK OFFICE
CERTIFICATE OF CORRECTION

PATENT NO. : 11,237,460 B2
APPLICATION NO. : 16/922443
DATED : February 1, 2022
INVENTOR(S) : Karle Page 1 of 1

It is certified that error appears in the above-identified patent and that said Letters Patent is hereby corrected as shown below:

In the Claims

In Claim 1 (at Column 7, Line 30), please delete the word, "nonadjacent" and replace with the word --non-adjacent--.

In Claim 1 (at Column 7, Line 32), please delete the word, "nonadjacent" and replace with the word --non-adjacent--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*